(12) United States Patent
Kopko

(10) Patent No.: US 7,908,881 B2
(45) Date of Patent: Mar. 22, 2011

(54) HVAC SYSTEM WITH POWERED SUBCOOLER

(75) Inventor: William L. Kopko, York, PA (US)

(73) Assignee: York International Corporation, York, PA (US)

( * ) Notice: Subject to any disclaimer, the term of this patent is extended or adjusted under 35 U.S.C. 154(b) by 799 days.

(21) Appl. No.: 11/375,621

(22) Filed: Mar. 14, 2006

(65) Prior Publication Data
US 2006/0201188 A1    Sep. 14, 2006

Related U.S. Application Data

(60) Provisional application No. 60/661,534, filed on Mar. 14, 2005.

(51) Int. Cl.
*F25D 17/00* (2006.01)
(52) U.S. Cl. .................. 62/333; 62/79; 62/335; 62/513
(58) Field of Classification Search .............. 62/333, 62/335, 513, 223, 79, 175
See application file for complete search history.

(56) References Cited

U.S. PATENT DOCUMENTS

| | | | |
|---|---|---|---|
| 2,388,556 A | | 11/1945 | Lathrop |
| 2,692,481 A | * | 10/1954 | Schweller ........................ 62/203 |
| 2,717,765 A | | 9/1955 | Lawler, Jr. |
| 3,733,845 A | * | 5/1973 | Lieberman ........................ 62/335 |
| 3,852,974 A | | 12/1974 | Brown |
| 4,060,123 A | * | 11/1977 | Hoffman et al. .............. 165/11.1 |
| 4,207,749 A | | 6/1980 | Lavigne, Jr. |
| 4,304,100 A | | 12/1981 | Ibrahim |
| 4,316,366 A | | 2/1982 | Manning |
| 4,374,468 A | * | 2/1983 | Takeshita et al. ................ 62/333 |
| 4,483,156 A | * | 11/1984 | Oudenhoven ................ 62/324.1 |
| 4,577,468 A | | 3/1986 | Nunn, Jr. et al. |
| 4,594,858 A | | 6/1986 | Shaw |
| 4,696,168 A | | 9/1987 | Woods et al. |

(Continued)

FOREIGN PATENT DOCUMENTS
CN    1886625 A    12/2006
(Continued)

OTHER PUBLICATIONS

Thorton et al., Dedicated Mechanical Subcooling Design Strategies for Supermarket Applications, Int. J. Refrig., 1994.

(Continued)

*Primary Examiner* — Cheryl J Tyler
*Assistant Examiner* — Justin Loffredo
(74) *Attorney, Agent, or Firm* — McNees Wallace & Nurick LLC

(57) ABSTRACT

An HVAC system having a main circuit and a subcooler circuit. The main circuit includes a main circuit evaporator, a main circuit expansion device, a main circuit condenser and a main circuit compressor connected in a closed refrigerant loop. The subcooler circuit includes a subcooler evaporator, a subcooler expansion device, a subcooler condenser and a subcooler compressor connected in a closed refrigerant loop. The subcooler evaporator is arranged and disposed to exchange heat between liquid refrigerant in the main circuit and the refrigerant in the subcooler circuit to cool the liquid refrigerant in the main circuit prior to entering the main circuit evaporator. The operation of the subcooler circuit provides an increased cooling capacity per unit of a mass flow of cooling fluid through the main circuit condenser and subcooler condenser for the HVAC system with a predetermined design efficiency.

25 Claims, 12 Drawing Sheets

U.S. PATENT DOCUMENTS

| | | | |
|---|---|---|---|
| 4,760,707 A | | 8/1988 | Dennis et al. |
| 4,811,568 A | | 3/1989 | Horan et al. |
| 4,873,839 A | | 10/1989 | Dessanti et al. |
| 5,067,326 A | | 11/1991 | Alsenz et al. |
| 5,095,712 A | | 3/1992 | Narreau |
| 5,372,014 A | * | 12/1994 | Adams ............... 62/175 |
| 5,628,201 A | * | 5/1997 | Bahel et al. ............ 62/211 |
| 5,694,783 A | * | 12/1997 | Bartlett ............... 62/211 |
| 5,729,993 A | | 3/1998 | Boiarski et al. |
| 5,802,860 A | * | 9/1998 | Barrows ............... 62/126 |
| 6,405,559 B1 | | 6/2002 | Yoneda |
| 6,427,460 B1 | | 8/2002 | Zanon |
| 6,481,231 B2 | * | 11/2002 | Vogel et al. ............ 62/278 |
| 6,595,009 B1 | | 7/2003 | Howard et al. |
| 6,694,750 B1 | | 2/2004 | Lifson et al. |
| 6,708,511 B2 | | 3/2004 | Martin |
| 6,718,781 B2 | | 4/2004 | Freund et al. |
| 6,820,434 B1 | | 11/2004 | Gutheim et al. |
| 2002/0002832 A1 | * | 1/2002 | Krauter ............... 62/180 |
| 2004/0031278 A1 | | 2/2004 | Martin |
| 2007/0271936 A1 | | 11/2007 | Wakamoto et al. |

FOREIGN PATENT DOCUMENTS

| | | |
|---|---|---|
| EP | 0056780 A2 | 7/1982 |
| JP | 07127934 | 5/1995 |
| WO | 03014637 A2 | 2/2003 |

OTHER PUBLICATIONS

Couvillion, Ph.D., P.E., et al., Analysis of a Vapor-Compression Refrigeration System with Mechanical Subcooling, ASHRAE Trans., 1988.

* cited by examiner

HVAC SYSTEM WITH POWERED SUBCOOLER

FIELD OF THE INVENTION

The present invention is directed to an HVAC system. In particular, the present invention is drawn to a chiller system with a powered subcooler.

BACKGROUND OF THE INVENTION

Extensive development work spanning many decades has been spent in optimizing the design of commercial air conditioners.

One attempt to optimize commercial air conditioners includes the installation of an economizer. Economizers have been commonly used in screw chillers. A typical economizer introduces refrigerant flash gas from an intercooler to the compressor at a pressure that is between that of the evaporator and the condenser. The introduction of moderate pressure refrigerant gas improves the efficiency of the thermodynamic cycle in spite of limited compressor efficiency. In another attempt to optimize commercial air conditioners, a heat exchanger is used to cool the refrigerant liquid leaving the condenser using refrigerant boiling at an intermediate pressure which is returned to the compressor. Both types of systems are commonly used and give a relatively small improvement in capacity (about 10% to about 15%) for typical air-cooled chiller conditions. Another limitation is that these approaches require a special port to the compressor to allow the introduction of intermediate pressure gas. Additional compressor losses associated with this port generally do not allow the full theoretical benefit of the economizer cycle.

Powered subcoolers have seen limited use in low-temperature refrigeration systems, such as in supermarket refrigerators and/or freezers. They use a separate refrigerant circuit for cooling refrigerant liquid in the main refrigeration system in order to obtain lower temperatures at the evaporator required for refrigeration. They have found little or no use in air conditioning systems. These systems generally cool liquid refrigerant to about 32° F. to 50° F. (0 to 10° C.), which would introduce a substantial performance penalty in air conditioning systems. In addition, the prior art teaches the use of separate condensers for the main circuit and subcooler circuit, which increases the space requirements for the system.

With the phase out of HCFC-22 (chlorodifluoromethane), the industry is moving rapidly toward the use of higher-pressure refrigerants. The new refrigerants have pressures higher than that of HCFC-22 with the most promising candidate being designated by ASHRAE as R-410A, a mixture of difluoromethane (R32, $CH_2F_2$) and pentafluoroethane (R125, $CHF_2CF_3$). This refrigerant has found use in HVAC chiller applications. Other higher-pressure refrigerants include carbon dioxide, R32, and R125. When the outdoor ambient temperature is very high (i.e., greater than about 95° F. (35° C.)), the temperature of refrigerant in the condenser begins to approach its critical temperature. For example, R-410A has a critical temperature of about 160° F. (71° C.). For carbon dioxide with a critical temperature of 90° F. (32.2° C.), the issues with operation near or above the critical temperature are even greater. As the refrigerant reaches or exceeds its critical temperature, the condenser loses the ability to condense the refrigerant, leading to efficiency and capacity losses and/or system failures during times of high outdoor ambient temperature.

What is needed is an HVAC chiller system having improved cooling capacity and efficiency without the drawbacks of the prior art.

SUMMARY OF THE INVENTION

The present invention includes an HVAC system having a main circuit and a subcooler circuit. The main circuit includes a main circuit evaporator, a main circuit expansion device, a main circuit condenser and a main circuit compressor connected in a closed refrigerant loop. The subcooler circuit includes a subcooler evaporator, a subcooler expansion device, a subcooler condenser and a subcooler compressor connected in a closed refrigerant loop. The subcooler evaporator is arranged and disposed to exchange heat between liquid refrigerant in the main circuit and the refrigerant in the subcooler circuit to cool the liquid refrigerant in the main circuit prior to entering the main circuit evaporator. The operation of the subcooler circuit provides an increased cooling capacity per unit of a mass flow of cooling fluid through the main circuit condenser and subcooler condenser for the HVAC system with a predetermined design efficiency.

Another embodiment of the present invention includes a refrigeration system having a main circuit, a first subcooler circuit and a second subcooler circuit. The main circuit includes a main circuit evaporator, a main circuit expansion device, a main circuit condenser and a main circuit compressor connected in a closed refrigerant loop. The first subcooler circuit comprising a first subcooler evaporator, a first subcooler expansion device, a first subcooler condenser and a first subcooler compressor connected in a closed refrigerant loop. The second subcooler circuit includes a second subcooler evaporator, a second subcooler expansion device, a second subcooler condenser and a second subcooler compressor connected in a closed refrigerant loop. The first subcooler evaporator and second subcooler evaporator are each arranged and disposed to exchange heat between liquid refrigerant in the main circuit and the refrigerant in the corresponding subcooler circuit to cool the liquid refrigerant in the main circuit prior to entering the main circuit evaporator.

Another embodiment of the present invention includes an HVAC system having a main circuit and subcooler circuit. The main circuit includes a main circuit evaporator, a main circuit expansion device, a main circuit condenser and a main circuit compressor connected in a closed refrigerant loop. The main circuit circulates a refrigerant with a critical temperature below about 80° C. The subcooler circuit includes a subcooler evaporator, a subcooler expansion device, a subcooler condenser and a subcooler compressor connected in a closed refrigerant loop. The subcooler evaporator is arranged and disposed to exchange heat between liquid refrigerant in the main circuit and the refrigerant in the subcooler circuit to cool the liquid refrigerant in the main circuit prior to entering the chiller evaporator. The operation of the subcooler circuit provides greater cooling capacity per mass flow of cooling fluid through the main circuit condenser and subcooler condenser for the HVAC system with a predetermined design efficiency.

Another embodiment of the present invention includes a method for subcooling an HVAC system that includes providing a main circuit comprising a main circuit evaporator, a main circuit expansion device, a main circuit condenser and a main circuit compressor in a refrigerant loop and a subcooler circuit comprising a subcooler evaporator, a subcooler expansion device, a subcooler condenser and a subcooler compressor in a refrigerant loop. The method further includes subcooling refrigerant in the main circuit with the subcooler evaporator prior to entering the main circuit evaporator to provide an increased cooling capacity per unit of airflow through the condenser for the HVAC system with a predetermined design efficiency. An ambient air temperature or a refrigerant temperature is sensed. The compressor in each of the main circuit and the subcooler circuit are activated or deactivated in response to the sensed condition. The method further includes activating or deactivating one or more fluid moving devices providing fluid flow to the main circuit condenser and subcooler condenser in response to the sensed condition.

An advantage of the present invention is that the system has a larger capacity than is available with conventional economizer cycles, and operates at an increased efficiency with respect to conventional economizer cycles.

A further advantage of the present invention is that the additional efficiency and capacity can be provided without complicated equipment or wiring, allowing the system to be manufactured at a relatively low cost. The powered subcooler circuit includes a design having equipment that is readily available and is easily manufactured. In addition, the increased cooling capacity of the system of the present invention offsets at least a portion of the cost of the additional equipment.

Yet another advantage of the present system is that the addition of powered subcooler systems according to the present invention permits the use of smaller condenser coils, while providing increased cooling capacity.

Another advantage of the present system is that the system may operate at high ambient temperatures, including temperatures that exceed 95° F. (35° C.).

Still another advantage of the present invention is that the system operates with a reduced fan noise at the same capacity, as compared to a convention chiller system. The reduced fan noise results because the required size of the condenser and the number of fans/fan capacity is smaller, therefore reducing the fan noise produced by the condenser.

Still yet another advantage of the present invention is that the system is able to provide additional stepped control of subcooler capacity when ambient conditions change. Each of the subcooler circuits provides a predetermined amount of subcooling. Therefore, activating and deactivating the individual subcooling circuits in response to subcooling requirements permits the system to operate with less energy costs.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
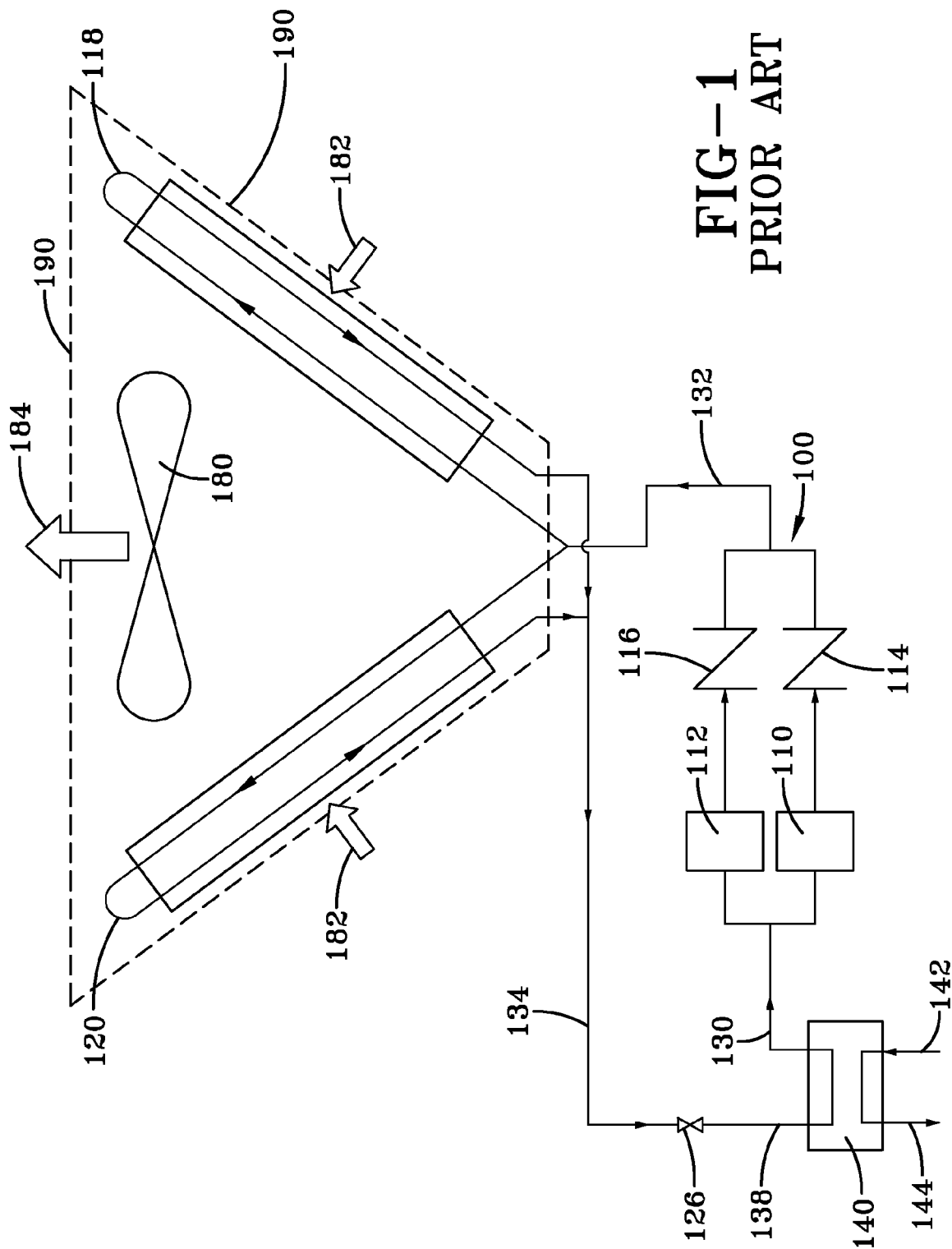
FIG. 1 schematically illustrates a known chiller system.

FIG. 1 shows a prior art chiller system. This configuration contains a main circuit 100 having a first compressor 110, a second compressor, 112, an expansion device 126, an evaporator 140, and a condenser 190. The main circuit 100 preferably uses a higher pressure refrigerant, such as chlorodifluoromethane ($CHClF_2$), commonly referred to as ASHRAE designation R-22, or mixtures of difluoromethane ($CH_2F_2$) and pentafluoroethane ($CHF_2CF_3$), commonly referred to as ASHRAE designation R-410A. The first compressor 110 and second compressor 112 are preferably scroll compressors. Although scroll compressors are preferred, any suitable type of compressor may be used. Suitable compressors include, for example, screw compressors, reciprocating compressors, rotary compressors, or centrifugal compressors. A first check valve 114 and a second check valve 116 are located between the compressor and condenser to prevent backflow of refrigerant vapor through the compressor that is not operating when only one is operating. Although FIG. 1 depicts two compressors, any number of compressors may be used. A discharge line 132 supplies pressurized refrigerant vapor to condenser coils 118 and 120. A liquid line 134 takes condensed refrigerant from the condenser coils 118 and 120 to an expansion device 126. The expansion device may be any suitable expansion device, including, but not limited to, expansion valves, and capillary tube arrangements. A mixture of liquid and vapor flows from the expansion device 126 through an evaporator inlet 138 and an evaporator 140. Superheated refrigerant vapor leaves the evaporator and flows through a suction line 130 back to the first and second compressors 110 and 112. A warm fluid 142 enters evaporator 140, commonly referred to as a chiller, and transfers thermal energy to the refrigerant fluid to produce cooled fluid 144. The warm fluid 142 and cooled fluid 144 passing through the evaporator 140 is preferably a liquid, such as water, ethylene glycol or brine. The cooled fluid 144 is preferably used to cool an indoor space. Although warm fluid 142 and cooled fluid 144 is preferably liquid, the warm fluid 142 and cooled fluid 144 may also be air or other gas. Condenser 190 includes a fan 180 that draws ambient air 182 through the condenser coils 118 and 120, and exhausts heated air 184 to the environment. The system shown in FIG. 1 does not maintain cooling efficiencies in high ambient temperatures.

Figure 2:
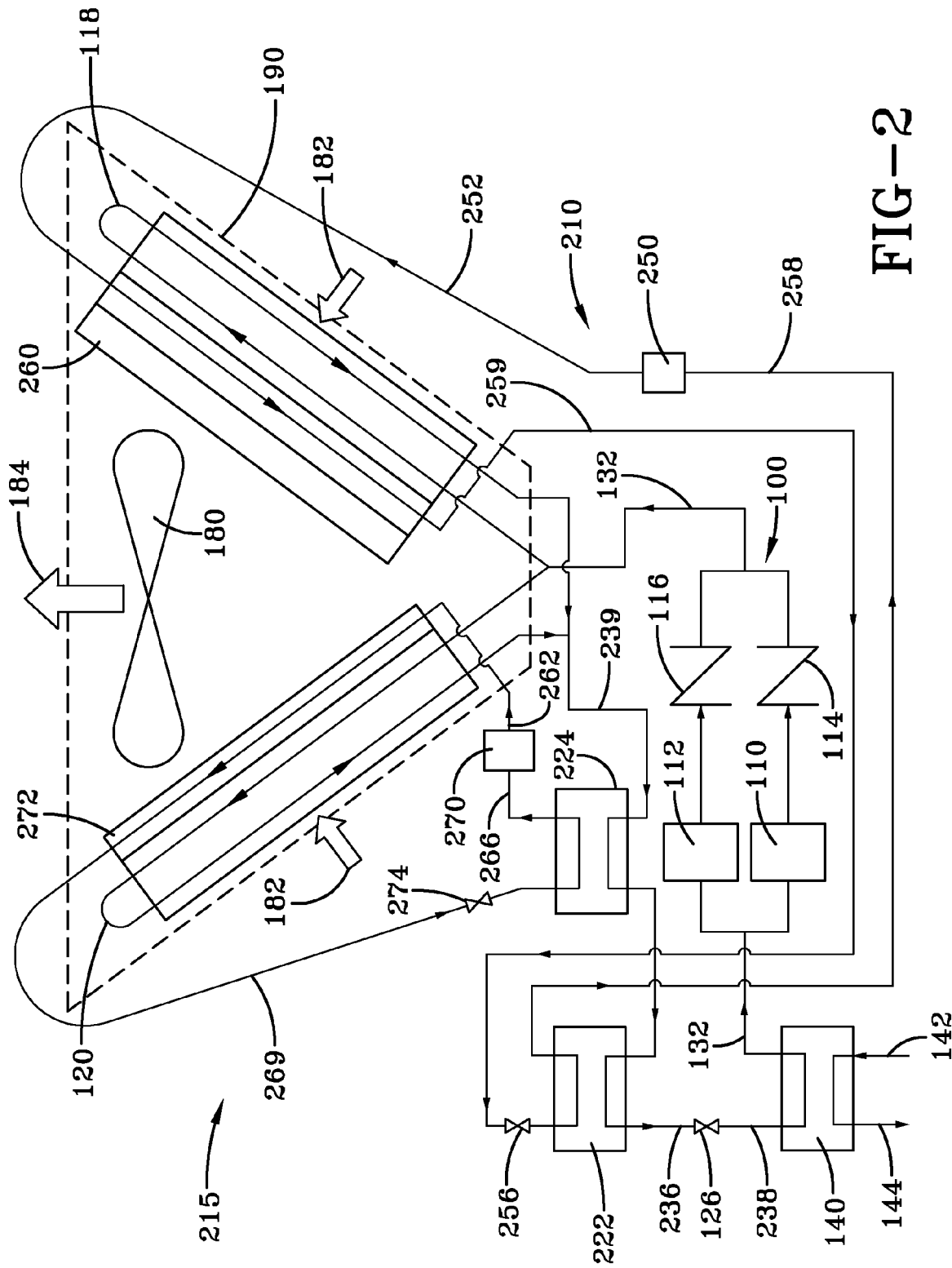
FIG. 2 schematically illustrates a chiller system according to one embodiment of the present invention.

FIG. 2 shows a chiller system according to a preferred embodiment of the present invention including a powered subcooler. FIG. 2 includes the main circuit 100, as shown in FIG. 1, having the first compressor 110, the first check valve 114, the second compressor 112, the second check valve 116, the evaporator 140, including inlet fluid stream 142 and outlet fluid stream 144, fan 180, ambient air 182 and heated air 184, arranged substantially as described above with respect to FIG. 1. However, the embodiment of the invention shown in FIG. 2 further includes a first subcooler circuit 210 and a second subcooler circuit 215. The first subcooler circuit 210 includes a compressor 250, a condenser coil 260, an expansion device 256 and a first subcooler 222. The second subcooler circuit 215 includes a compressor 270, a condenser coil 272, an expansion device 274 and a second subcooler 224. Like in the main circuit 100, the expansion device in the first and second subcooler circuits 210 and 215 may be any suitable expansion device, including, but not limited to, expansion valves, and capillary tube arrangements. The first and second subcoolers 222 and 224 each include a heat exchanger that transfers heat between the main circuit 100 and the first subcooler circuit 210 and the main circuit 100 and the second subcooler circuit 215. The heat exchanger of the first and second subcoolers 222 and 224 is preferably a plate heat exchanger, but may be any suitable heat exchanger. The liquid line 239 takes condensed refrigerant from the condenser coils 118 and 120 to the second subcooler 224. Liquid refrigerant leaves the outlet of the second subcooler 224 and then flows into a first subcooler 222. Cooled refrigerant liquid leaves the first subcooler 222 through liquid line 236 and flows through an expansion device 126 to the evaporator 140. The remainder of the main circuit 100 operates as shown and described with respect to FIG. 1, above.

While FIG. 2 shows the main circuit 100 with a single refrigerant circuit, the main circuit 100 according to the invention may include systems with multiple refrigerant circuits. For example, the main circuit may include a scroll chiller with design cooling capacities greater than about 30 tons, which typically include two circuits. Large scroll or screw chiller systems according to the present invention may have as many as four circuits. The evaporator 140 (i.e., chiller) is normally configured so that each refrigerant circuit is in contact with the full water flow through the heat exchanger.

The first and second subcooler circuits 210 and 215 cool liquid refrigerant leaving the condenser coils 118 and 120 in the main circuit 100 by exchanging heat in the first and second subcoolers 222 and 224. The exchange of heat provides subcooling to the liquid refrigerant, permitting the system to operate at a higher efficiency, greater capacity and at higher ambient temperatures. The refrigerant in the subcooler circuits 210 and 215 are preferably a lower pressure refrigerant, such as tetrafluoroethane, commonly known as ASHRAE designation R-134a. Although R-134a is preferred, refrigerants including R410A, R407C, R-152a, propane, dimethyl ether, ammonia or other suitable refrigerant may be used in the first and second subcooler circuits 210 and 215.

The first subcooler circuit 210 comprises a compressor 250, condenser coil 260, an expansion device 256, and a first subcooler 222 as discussed above. These components are connected with refrigerant piping to form a closed loop refrigerant circuit. The compressor 250 supplies pressurized refrigerant vapor to condenser coil 260 via discharge line 252, which cools the refrigerant to form refrigerant liquid that flows to the expansion device 256 via liquid line 259. The liquid refrigerant passes through the expansion device 256 to first subcooler 222, where the refrigerant evaporates. The evaporating refrigerant in the first subcooler circuit 210 exchanges heat with the refrigerant in the main circuit 100 in the first subcooler 222. The exchange of heat cools the refrigerant in the main circuit 100 to a lower temperature prior to the refrigerant in the first subcooler circuit 210 returning to compressor 250 via suction line 258.

The second subcooler circuit 215 is similar to the first. A compressor 270 is connected via a discharge line 262 to a condenser coil 272. Liquid refrigerant from the condenser coil 272 then flows through a liquid line 269 to an expansion device 274 and then through the second subcooler 224. The utilization of multiple subcoolers permits the use of a simple expansion device as expansion device 274. However, any suitable expansion device may be utilized. In one embodiment of the invention, expansion device 274 is a fixed orifice and expansion device 256 in the first subcooler circuit 210 is an expansion valve. Similar to the first subcooler circuit 210, the refrigerant in the second subcooler circuit 215 evaporates and exchanges heat with the refrigerant in the main circuit 100 in the second subcooler 224. The exchange of heat cools the refrigerant in the main circuit 100 to a lower temperature. Suction line 266 allows refrigerant vapor to return from the second subcooler 224 to the compressor 270 to complete the circuit.

The condenser 190 of FIG. 2 is arranged and configured to condense refrigerant vapor in the main circuit 100 and to condense refrigerant in both the first and second subcooler circuits 210 and 215. Fan 180 draws ambient air 182 through the condenser coils 118, 120, 260, and 272 and exhausts heated air 184 to the environment. The condenser coils 260 and 272 for the first and second subcooler circuits 210 and 215 are preferably positioned downstream of the air passing over condenser coils 118 and 120 for the main circuit 100. This arrangement allows the first and second subcooler circuits 210 and 215 to utilize air leaving the main condenser coils without substantially raising the condensing temperature in the main circuit 100. The condenser coils 260 and 272 for the first and second subcooler circuits 210 and 215 can be separate coils from the condenser coils 118 and 120 of the main circuit 100 or can be a portion of the same coil. In a preferred embodiment, the condenser coils 272 and 260 are arranged to provide flow of refrigerant from the top of the condenser 190 to the bottom of the condenser 190, in order to provide a flow substantially in the direction of gravity. Although flow may be arranged in either direction, this embodiment provides an arrangement where the liquid flows more easily from the condenser 190.

The heat exchangers for the first and second subcoolers 222 and 224 are preferably plate heat exchangers. Plate heat exchangers may be provided at a relatively low cost and small size. Two plate heat exchangers can be assembled back-to-back into a single unit, which can save cost and space. Although plate heat exchangers are preferred, any suitable type of heat exchanger may be used. Suitable heat exchangers include tube-in-tube and shell-and-tube heat exchangers.

The first and second subcoolers 222 and 224 are arranged to provide a small pressure drop for the refrigerant liquid when passed through the first and second subcoolers 222 and 224 in the main circuit 100 so as to reduce or eliminate the risk of undesirable flashing of refrigerant to the vapor phase inside the first and second subcooler 222 and 224 heat exchangers. In a preferred embodiment, the heat exchangers are arranged so that when the first and second subcooler circuits 210 and 215 are not running, the pressure drop is sufficiently small so as to prevent undesirable flashing of refrigerant to the vapor phase inside the heat exchangers.

Figure 3:
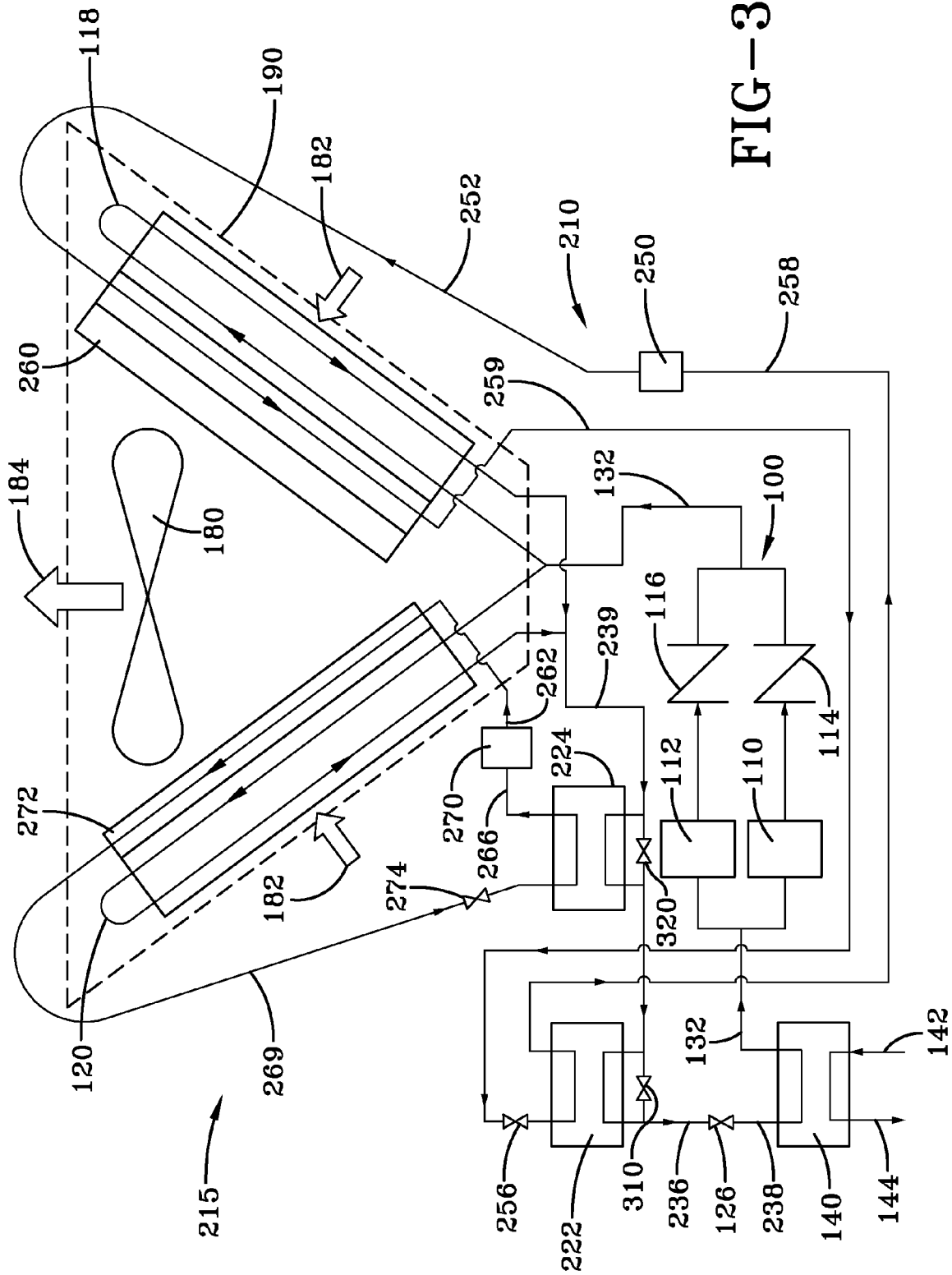
FIG. 3 schematically illustrates a chiller system according to an alternate embodiment of the present invention.

FIG. 3 shows the same arrangement of the main circuit 100, first subcooler circuit 210 and second subcooler circuit 215 shown in FIG. 2. FIG. 3 further includes a first bypass valve 310 and a second bypass valve 320. First bypass valve 310 allows flow of refrigerant liquid around the first subcooler 222. Likewise, second bypass valve 320 allows flow of refrigerant liquid around second subcooler 224. In the embodiment shown in FIG. 3, free flow of liquid refrigerant around the heat exchangers is allowed when the one or both of the subcooler circuits are not operating. The bypass prevents reduction in the pressure drop experienced when the refrigerant is passed through one or both of the first and second subcoolers 222 and 224. First and second bypass values 310 and 320 are desirable during certain operating conditions, such those that occur at low ambient temperatures.

Figure 4:
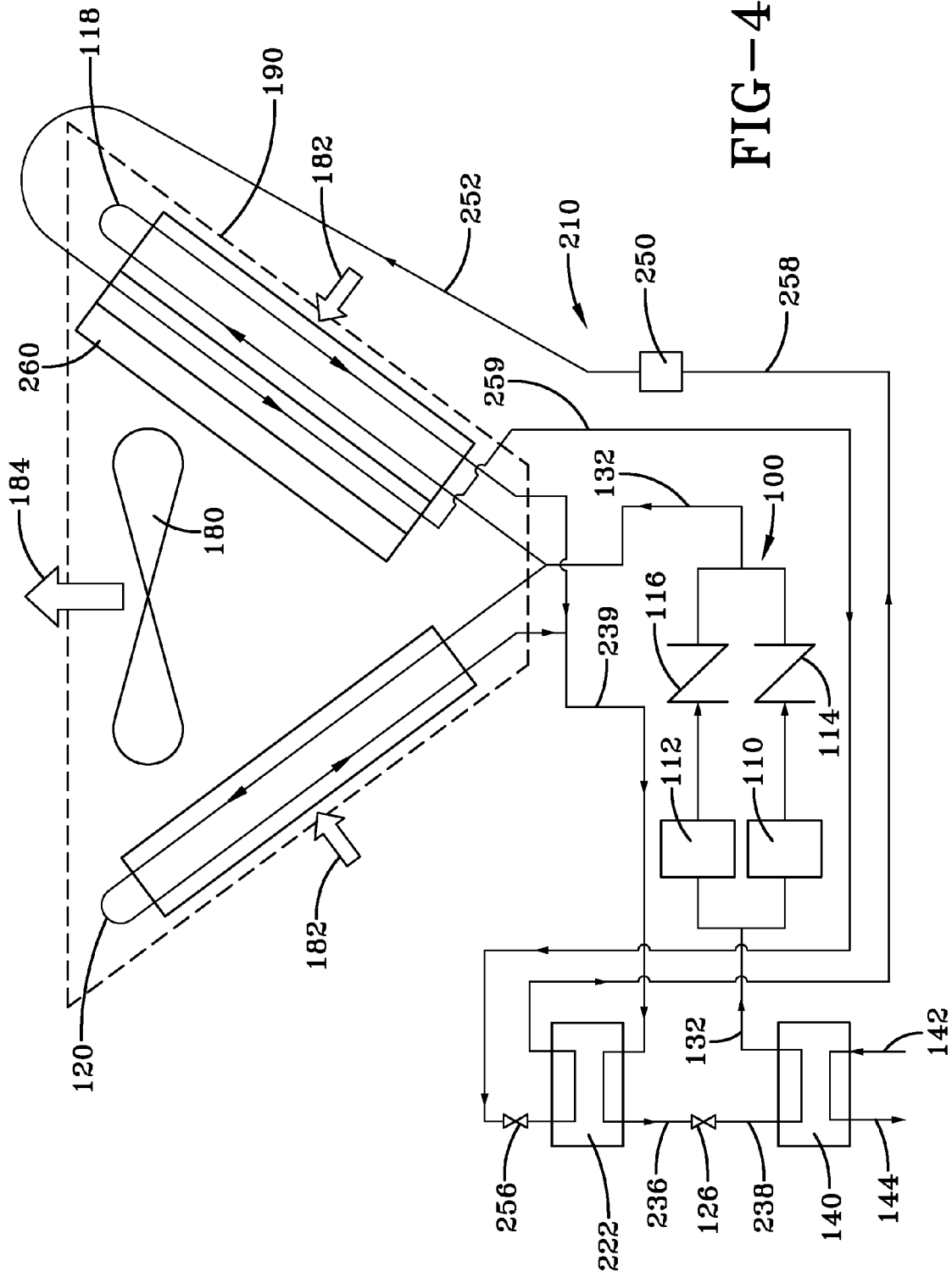
FIG. 4 schematically illustrates a chiller system according to another alternate embodiment of the present invention.

FIG. 4 shows another embodiment of the present invention that includes the main circuit 100 and first subcooler circuit 210, as shown and described above with respect to FIG. 2. In this embodiment, first subcooler circuit 210 alone is used to provide cooling to the refrigerant liquid flowing from condenser coils 118 and 120. A single subcooler circuit may be used in order to provide the cooling of the liquid refrigerant of the main circuit 100 while requiring less components and piping.

Figure 5:
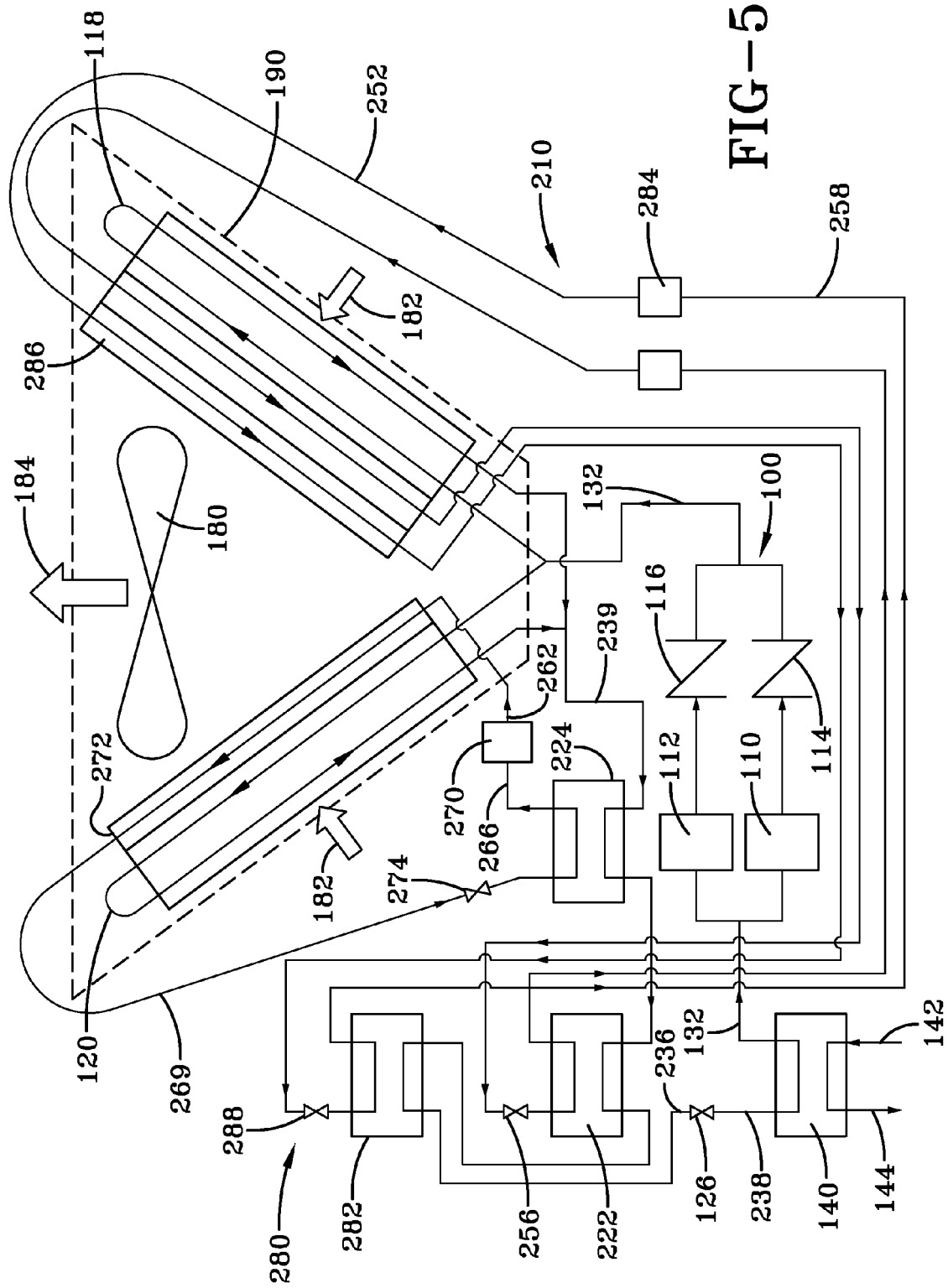
FIG. 5 schematically illustrates a chiller system according to still another alternate embodiment of the present invention.

FIG. 5 shows another embodiment of the present invention having three subcooler circuits. FIG. 5 shows a configuration of the main circuit 100, the first subcooler circuit 210 and the second subcooler circuit 215, as shown and described in FIG. 2. However, FIG. 5 also includes a third subcooler circuit 280 that includes a third subcooler 282. The third subcooler circuit 280 operates substantially the same as the first and second subcooler circuits 210 and 215, including the flow from a compressor 284, then to a condenser coil 286, then to an expansion device 288, then into the third subcooler 282, and then returning to the compressor 284 to complete the cycle. The third subcooler circuit 280 may provide improved coordination of the evaporating temperature in the subcooler circuits and the refrigerant liquid temperature in the main circuit 100. A third subcooler circuit allows for a greater portion of the subcooling to be done with a higher evaporating temperature in the subcooler circuits, which improves efficiency and capacity of the system. Additional subcooling circuits provide a better match between the evaporating temperatures in the subcooler circuits and the liquid refrigerant temperature in the main circuit 100, which permits increased system efficiency. Although FIG. 2 is shown as including two subcooler circuits, FIG. 4 shows one subcooler circuit and FIG. 5 shows three subcooler circuits, any number of subcooler circuits may be used. Multiple subcooler circuits, including those having two or more, allow greater coordination between the liquid temperature in the main circuit 100 and the evaporating temperature of the subcoolers, providing improved cycle efficiency.

Figure 6:
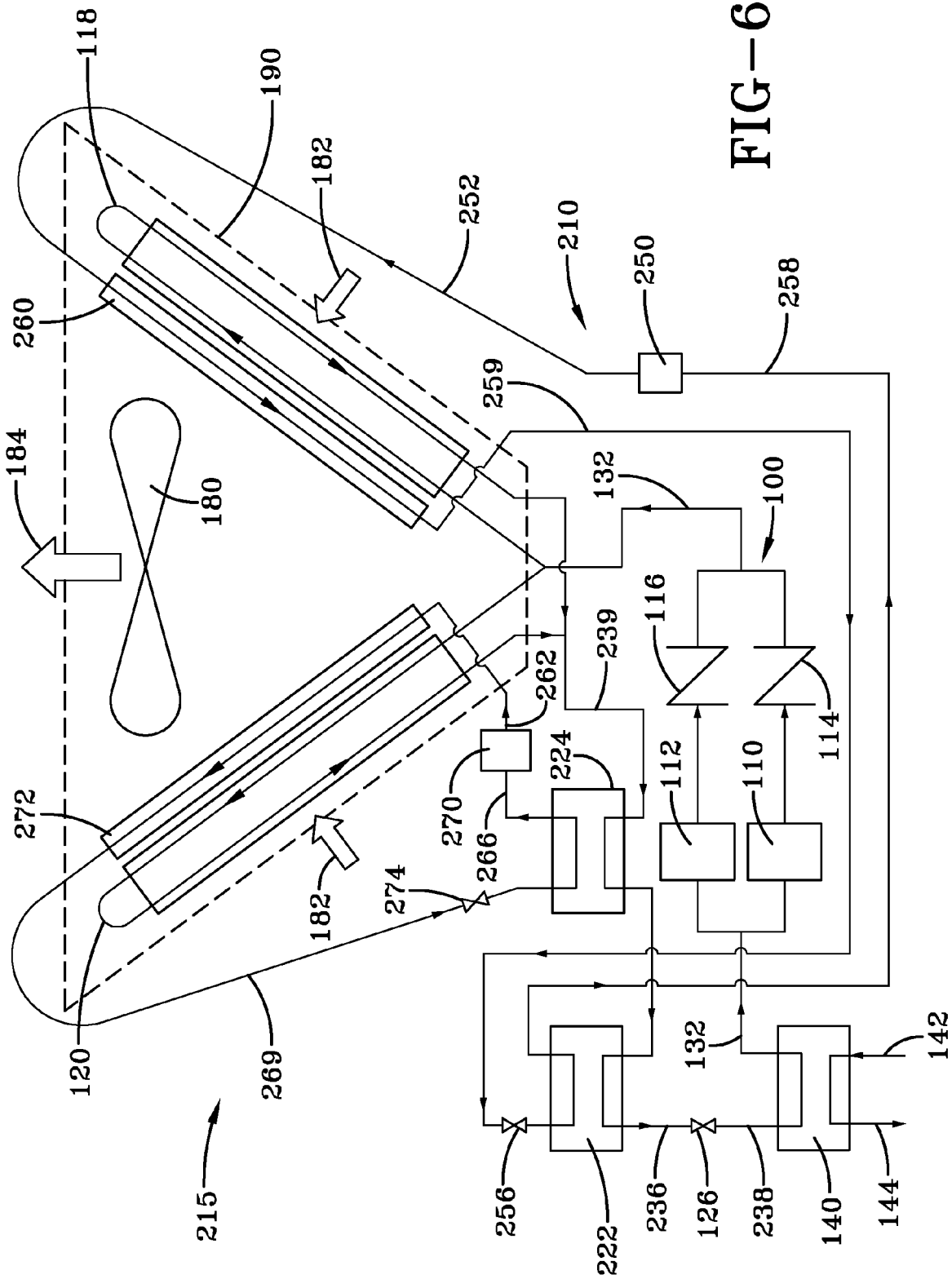
FIG. 6 schematically illustrates a chiller system according to still another alternate embodiment of the present invention.

FIG. 6 shows another embodiment of the invention, including the main circuit 100, the first subcooler circuit 210 and the second subcooler circuit 215, substantially as shown and described in FIG. 2. However, FIG. 6 includes condenser 190 having a 3-row coil for the main circuit 100 upstream in the air from a single coil for the first and second subcooler circuits 210 and 215. In this arrangement, the air flows through the main circuit 100 coils 118 and 120 before traveling through subcooler coils 260 and 272. This embodiment provides simple and inexpensive fabrication, where no reconfiguration of the conventional condenser for the main circuit 100 is required. FIG. 6 only requires the addition of the first and second subcoolers 222 and 224 to the main circuit 100. This embodiment provides a relatively inexpensive modification that may be applied to an existing system that only requires minor piping modifications to the main circuit 100.

Figure 7:
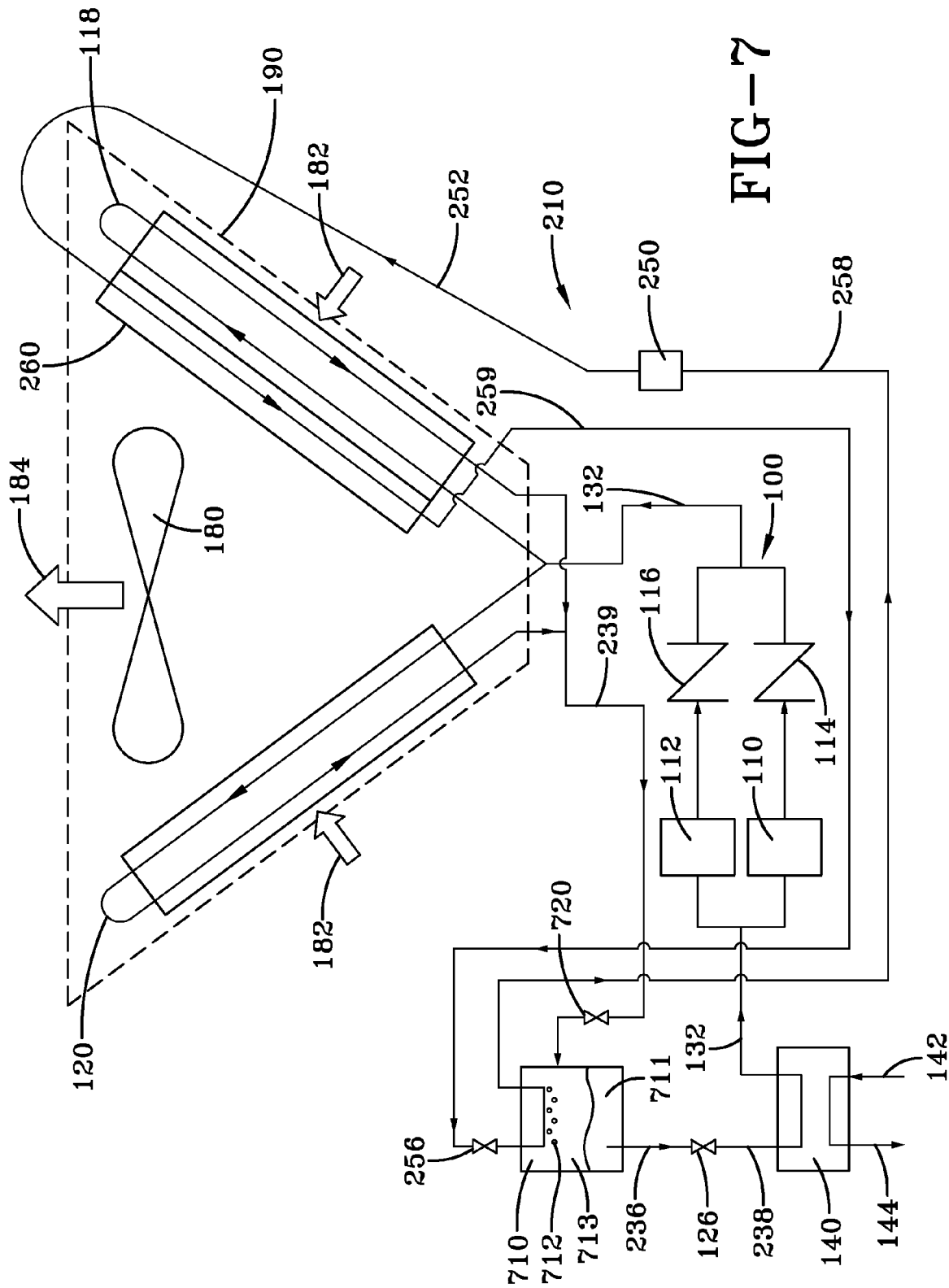
FIG. 7 schematically illustrates a chiller system according to still another alternate embodiment of the present invention.

FIG. 7 shows an alternate embodiment of the invention utilizing a combination of flash tank and subcooler. In this embodiment, a flash tank 710 is located in the main circuit 100 downstream from the condenser 190 and after passing through expansion device 720. The flash tank 710 acts to separate the refrigerant vapor 713 from refrigerant liquid 711, which settles at that bottom of the tank. The refrigerant in the first subcooler circuit 210 is evaporated after passing through expansion device 256. The heat transfer between the evaporating refrigerant in the first subcooler circuit 210 and the refrigerant vapor of the main circuit 100 in the flash tank 710 results in condensing of the refrigerant vapor of the main circuit 100 back to a liquid refrigerant 712, which falls to the bottom of the tank, becoming refrigerant liquid 711. The liquid refrigerant 711 then travels to expansion device 126 and evaporator 140 via refrigerant liquid line 236. This embodiment has the advantage of improving heat transfer coefficient, but it reduces temperature difference and increases system complexity.

Figure 8:
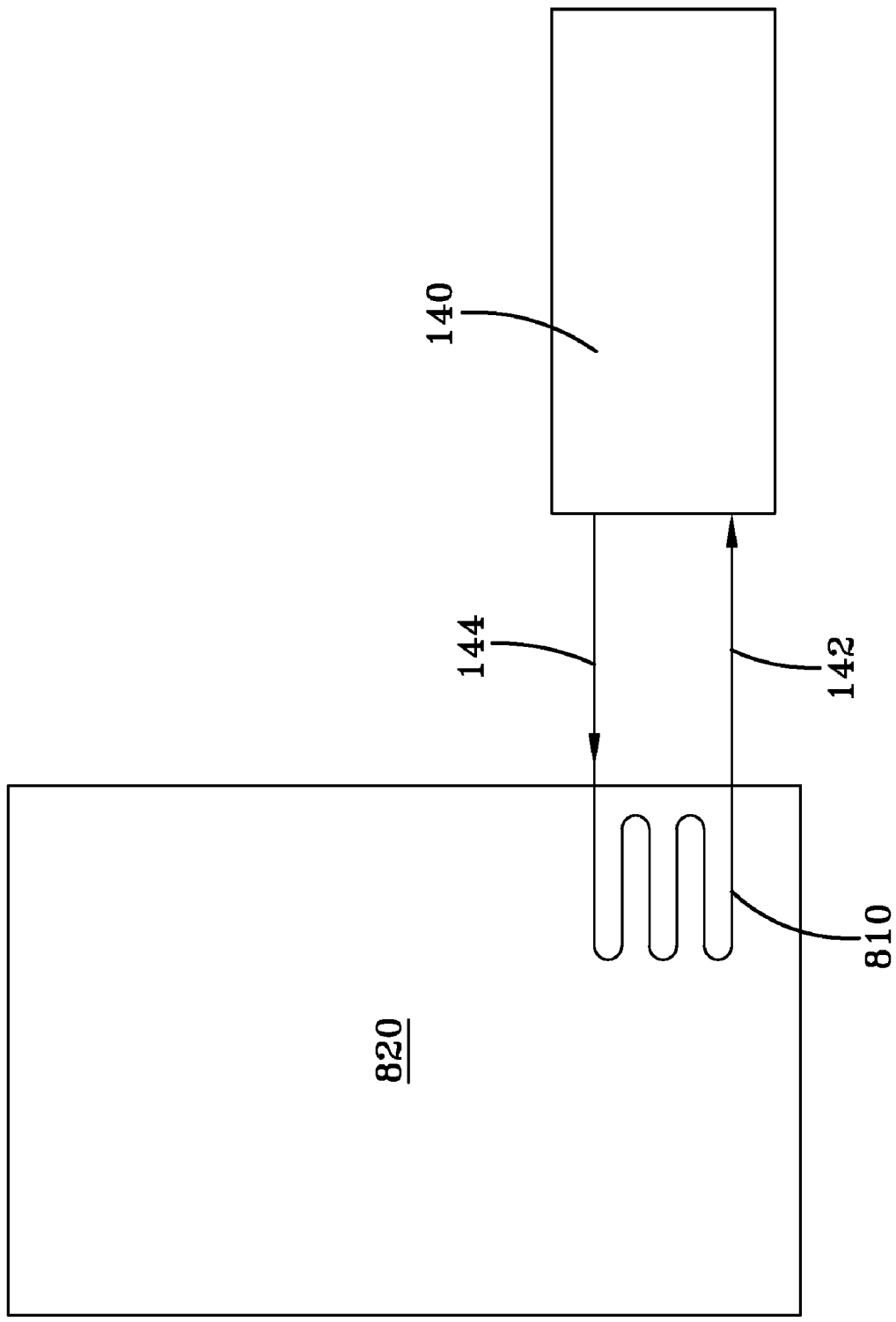
FIG. 8 schematically illustrates an air conditioning system according to an embodiment of the present invention.

FIG. 8 shows an example of the present invention wherein the evaporator 140 of the main circuit 100 is used for an air conditioning application. In this example, cool liquid, such as water, ethylene glycol or brine leaves the evaporator 140 via cooled fluid stream 144. The cool liquid then travels to a heat exchange device 810 in building 820. Heat exchange device 810 may include one or more heat exchangers disposed within the interior space in order to provide cooling. The cool liquid exchanges heat with the heating load within the building 820 and returns to the evaporator 140 via warm fluid stream 142. The warm liquid is then cooled in the evaporator 140 and the cycle repeats. The use of first and second subcooling circuits 210 and 215 permits the evaporator to cool a greater amount of fluid, thereby increasing the amount of heat that may be removed from building 820.

EXAMPLES

Table 1 below includes the conditions for an air-cooled chiller according to an embodiment of the present invention. In this embodiment, the system cools refrigerant liquid in the main circuit 100 from about 105° F. (41° C.) to about 60° F. (16° C.) using two steps. The two steps correspond to the cooling that takes place in each of the first and second subcoolers 222 and 224. Refrigerant in the second subcooler circuit 215 is evaporated in second subcooler 224. The evaporating refrigerant in the second subcooler 224 exchanges heat with the main circuit 100. The heat exchange results in a temperature of the liquid refrigerant leaving the second subcooler 224 of about 78.5° F. (26° C.). The evaporating refrigerant in the first subcooler 222 exchanges heat with the main circuit 100. The heat exchange results in a temperature of the liquid refrigerant leaving the first subcooler 222 of about 60° F. (16° C.). The refrigerant, which has a temperature of about 60° F., is then transported to the expansion device 126 and evaporator 140 to cool inlet fluid 142. The first and second subcooler circuits 210 and 215 include condenser coils 260 and 272 located in the air stream downstream of the condenser for the main circuit 100. The positioning of the condenser coils 260 and 272 results in little, if any, change in the condensing temperature for the main circuit 100. In this embodiment, the compressor displacement is the same for both the first and second subcooler circuits 210 and 215.

TABLE 1

| | |
|---|---|
| Refrigerant Liquid Temperature Leaving Condenser | 105° F. |
| Refrigerant Liquid Temperature Leaving Second Subcooler | 78.5° F. |
| Refrigerant Liquid Temperature Leaving First Subcooler | 60° F. |
| Second Subcooler Evaporating Temperature | 73.5° F. |
| Second Subcooler Condensing Temperature | 130° F. |
| First Subcooler Evaporating Temperature | 55° F. |
| First Subcooler Condensing Temperature | 125° F. |
| Ambient Air Temperature | 95° F. |
| Temperature of Air Leaving Condenser for Main Circuit | 115° F. |

Table 2 shows the performance for prior art systems compared to systems provided according to the present invention. The performance data is data resulting from performance effects based on computer models that compare compressor performance curves for commercially available scroll compressors and heat-exchanger performance calculations. Adding the powered subcooler gives approximately 25% more cooling capacity and more than 5% efficiency improvement at ambient temperatures of 95° F. while permitting the main circuit 100 to operate at evaporating and condensing temperature that are substantially the same as known chiller systems. In addition, the system provides 35% more cooling capacity and 10% more efficiency improvement at ambient temperatures of 115° F. If a larger evaporator 140 is selected for the main circuit 100 so as to keep the original evaporating temperature, the system can provide even greater performance advantages. To maintain the same evaporating temperature, the heat exchange surface area of the evaporator 140 increases approximately in proportion to the increase in cooling capacity. If larger compressors are selected for the main circuit 100 in addition to a larger evaporator 140, then about 40% increase in capacity is possible without increasing the physical dimensions of the chiller and while maintaining the original system efficiency.

For air-cooled chillers, a 2% increase in compressor capacity typically results in about a 1% decrease in chiller efficiency if no change is made in the size of the heat exchangers. This approximation means that a 7% efficiency improvement from the powered subcooler would allow roughly an additional 14% in chiller capacity through the use of larger compressors while meeting the original efficiency target. The 40 percent capacity or more increase in capacity (1.14×1.27=1.45) is possible by combining the use of the powered subcooler with larger compressor and evaporators, but without any increase in the total condenser air flow rate. Since the condenser size normally determines the overall unit dimensions, this increase in capacity should not affect the physical size of the unit and while maintaining the same chiller efficiency. The ability to increase system capacity for a given physical size and a given fan capacity, also helps to reduce overall system cost per unit of cooling capacity ($/ton).

Comparative Example 1 is a chiller system, as shown in FIG. 1, including a main circuit 100 having a first compressor 110, a second compressor 112, an expansion device 126, an evaporator 140, and a condenser 190. The condenser 190 includes a three-row coil. The operating conditions for Comparative Example 1 includes an evaporating temperature of about 39.7° F. (4.2° C.), and a condensing temperature of about 120.3° F. (49.1° C.).

Comparative Example 2 is a chiller system, as shown in FIG. 1, wherein the condenser 190 includes an additional coil than the condenser 190 in Comparative Example 1. Comparative Example 2 provides an operating condition that has an evaporating temperature of about 39.7° F. (4.2° C.). However, the condensing temperature is reduced to about 118.7° F. (48.2° C.). The addition of the fourth row coil provides a capacity increase over the Comparative Example 1 of only 1.0%. Likewise, efficiency is only increased by 2.6% over Comparative Example 1.

Comparative Example 3 is a chiller system, as shown in FIG. 1, wherein an economizer is utilized between the outlet of the condenser 190 and the inlet of the evaporator 140. The economizer introduces refrigerant flash gas from an intercooler to the compressor at a pressure that is between that of the evaporator 140 and the condenser 190. The introduction of intermediate pressure refrigerant gas allows the compressor to operate more efficiently. However, the economizer provides a capacity increase over the Comparative Example 1 of only 11.7%. Likewise, efficiency is only increased by 5.5% over Comparative Example 1. This performance is based on computer ratings for a known screw chiller with and without an economizer.

Example 1 is an embodiment of the present invention, as shown in FIG. 2. The first and second subcoolers 222 and 224 provide subcooling to the refrigerant in the main circuit 100 leaving the condenser 190. Example 1 provides an operating condition that has an evaporating temperature of about 38.7° F. (3.7° C.), which is below the evaporating temperature of Comparative Example 1. However, the condensing temperature is about 120.3° F. (49.0° C.). The subcooling of the liquid refrigerant leaving the condenser 190 in the main circuit 100 permits the increase in cooling capacity of 25.0% and an efficiency increase of 5.5%. The increase capacity and effi-

TABLE 2

| | Comparative Example 1: Chiller Unit With No Subcoolers | Comparative Example 2: Chiller - No Subcoolers With 4-Row Coil | Comparative Example 3: Chiller With Economizer | Example 1: Chiller with Powered Subcooler | Example 2: Chiller With Powered Subcooler and Larger Evaporator |
|---|---|---|---|---|---|
| Evaporating Temperature (° F.) | 39.7 | 39.7 | | 38.7 | 39.7 |
| Condensing Temperature (° F.) | 120.3 | 118.7 | | 120.3 | 120.7 |
| Capacity Improvement Based on Chiller Unit With No Subcoolers | 0.0% | 1.0% | 11.7% | 25.0% | 26.8% |
| Efficiency Improvement Based on Chiller Unit With No Subcoolers | 0.0% | 2.6% | 4.7% | 5.5% | 6.8% | ciency permit the fabrication of smaller evaporators and/or the fabrication of smaller condenser units for the same cooling loads.

Example 2 is an embodiment of the present invention, as shown in FIG. 2 wherein the system utilizes a larger evaporator than in Example 1. The surface area of the evaporator for the main circuit is increased roughly in proportion to the increase in cooling capacity so as to maintain approximately the same evaporating temperature. The increased size corresponds to the increased capacity that is achieved by subcooling the refrigerant in the main circuit 100. Example 1 provides an operating condition that has an evaporating temperature of about 39.7° F. (4.3° C.). However, the condensing temperature is about 120.7° F. (49.3° C.). The subcooler with larger cooler permits the increase in cooling capacity of 26.8% and an efficiency increase of 6.8%.

Capacity and Efficiency calculations in Table 2 were based upon the water chiller operating at standard conditions (95° F. ambient temperature, 44° F. leaving water temperature).

In an alternate embodiment, brine may be utilized in the chiller. The use of brine results in a lower liquid temperature, which increases the capacity and efficiency benefit of the powered subcooler system. In addition, a higher ambient temperature results in higher capacity and efficiency benefit from the powered subcooler in the chiller system. The system of the present invention allows improved efficiency and capacity at high ambient temperatures. In addition, the system permits the use of refrigerants, such as R-410A, R32, R125, and carbon dioxide, which have low critical temperatures.

In the embodiment wherein the refrigerant is carbon dioxide, the pressure of refrigerant in the condenser may exceed the critical pressure. In this case, the condenser may remove thermal energy from the refrigerant without a change of phase. The fluid leaving the condenser has properties similar to a liquid in that the carbon dioxide expands through a valve to a sufficiently low pressure to result in a two-phase mixture. Likewise, the refrigerant entering the condenser acts like a vapor in that it will not flash to a two-phase mixture. In this respect, the condenser performs essentially the same function as condenser utilizing other lower pressure refrigerant and the terms "liquid" and "vapor" can still reasonably apply to the carbon dioxide refrigerant at pressures above critical.

Figure 12:
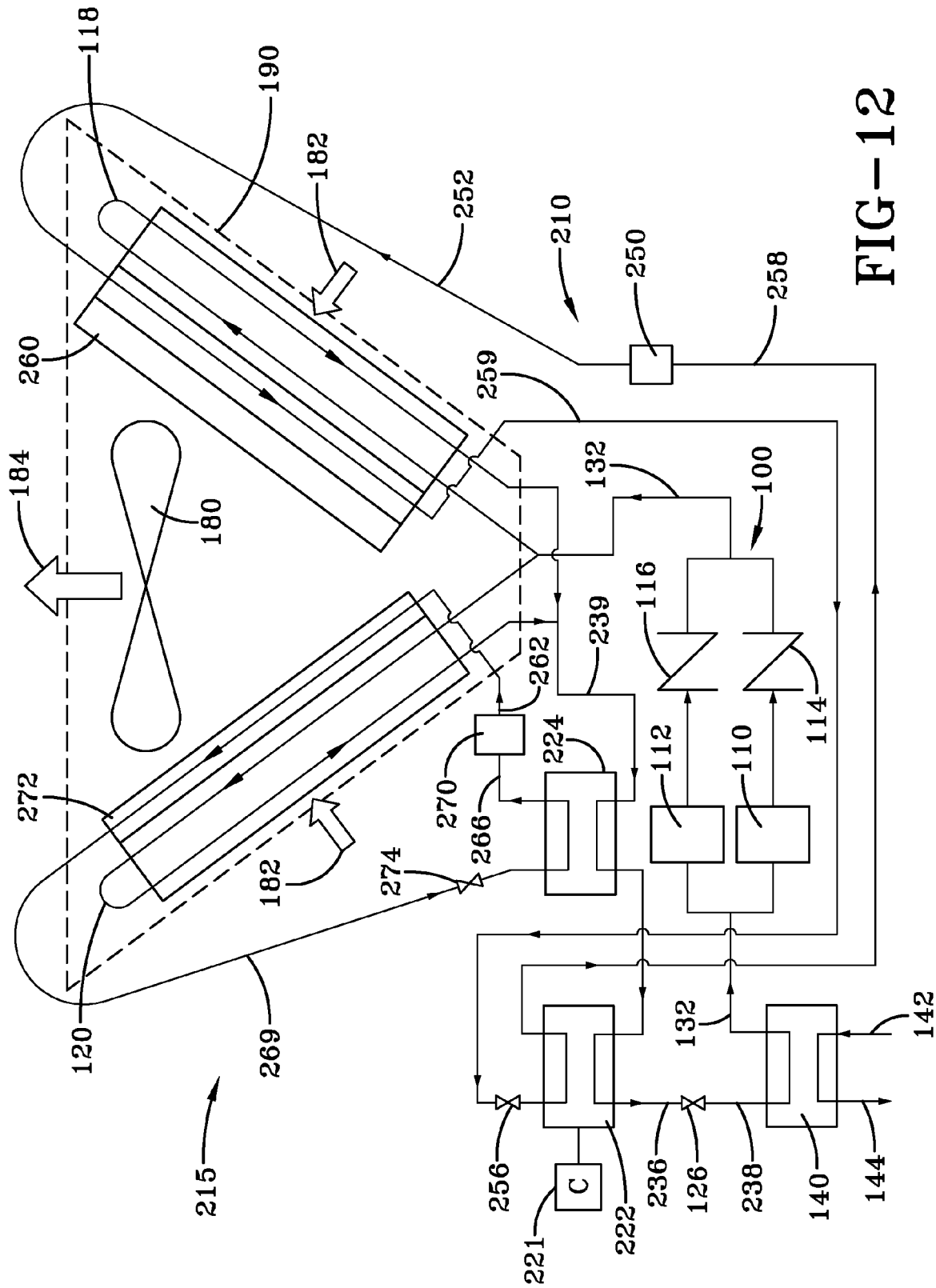
FIG. 12 schematically illustrates a chiller system according to a further embodiment of the present invention.

The chiller system having powered subcooler according to an embodiment of the invention has the advantage of providing good control over refrigerant liquid temperature while using relatively simple controls. For example, lower ambient air temperature results in lower refrigerant liquid temperatures in the main circuit 100 leaving the condenser 190. Likewise, the liquid temperature in the main circuit 100 leaving the first subcooler 222 to the evaporator 140 is also lower. As the liquid temperature of refrigerant in the main circuit 100 approaches the evaporating temperature, the amount of cooling taking place in the first and second subcoolers 222 and 224 is greater than optimum for overall system efficiency. In one embodiment of the invention shown in FIG. 12, a controller 221 senses a low ambient temperature or a low refrigerant temperature in the main circuit 100 exiting the first subcooler 222 and deactivates one or both of the first and second subcooler circuits 210 and 215, which allows the system to operate at optimum efficiency at off design conditions.

In addition to maintaining efficiency within the system, turning off subcoolers can also provide an additional step of capacity control, which may be desirable for better control of fluid temperatures at the chiller and reduced compressor cycling in the main circuit 100. For example, a controller 221 can deactivate one or both of the first and second subcooling circuits 210 and 215 when a reduced load condition is detected.

The compressors 250 and 270 present in the first and second subcooler circuits 210 and 215 are sized to provide sufficient cooling capacity to the first and second subcoolers 222 and 224 to reduce the temperature of the liquid refrigerant present in the main circuit 100 to the desired refrigerant temperature. Compressors 250 and 270 must be configured to handle high-saturated suction temperatures without overloading the compressor motor. In one embodiment of the present invention, compressors 250 and 270 of the first and second subcooler circuits 210 and 215, respectively, are configured for compressing high-pressure refrigerant. However, the first and second subcooler circuits 210 and 215 are charged with lower-pressure refrigerant. For example, compressors 250 and 270 may be configured to compress R-22 or R-407C refrigerant; however, the first and second subcooler circuits 210 and 215 are actually charged with R-134a, a lower-pressure refrigerant. The use of the lower-pressure refrigerant in the compressors configured for the higher-pressure refrigerants allows the first and second subcooler circuits 210 and 215 to operate more efficiently at the higher temperatures and pressures present in the first and second subcoolers 222 and 224. The use of a lower-pressure refrigerant roughly compensates for the increase in operating temperatures, which allows the use of conventional air-conditioning compressors with a minimum of design changes. In addition to R-134a, the refrigerant present in the first and second subcooler circuits 210 and 215 may include R152a, propane, dimethyl ether, ammonia, or other suitable refrigerants. Suitable refrigerants may be selected on the basis of lower pressure operation and environmental and safety concerns.

Although higher-pressure refrigerants, such as R410A, may be used in the first and second subcooler circuits 210 and 215, lower-pressure refrigerants are preferred because the compressor would have to be configured to handle the high operating pressures associated with high pressure refrigerants. The advantage of using a lower-pressure refrigerant in the subcooler circuit is that is offsets the pressure rise that would normally occur with the higher evaporating and higher condensing temperatures found in the subcooler circuit. Thus the operating pressures that are similar to those found in the compressor for conventional air conditioning duty. This feature prevents overload of the compressor motor or bearings or compressor shell with little or no change to the basic design of the compressor.

In one embodiment of the present invention, the first and second subcooler circuits 210 and 215 include compressors 250 and 270 of the same size. In this embodiment, the upstream circuit (i.e., the second subcooler circuit 215) will have a larger capacity when both circuits are running since it will see a higher evaporating temperature. Equally sized compressors permit operation with either one of the first and second subcooler circuits 210 or 215 with substantially equal system performance.

In another embodiment of the present invention, the system can use unequally sized compressors in the first and second subcooler circuits 210 and 215. The upstream subcooler circuit (e.g., second subcooler circuit 215) preferably has a smaller compressor displacement. This embodiment permits a liquid temperature change through the two subcoolers that is substantially equal. In addition to substantially equal liquid refrigerant temperature change, the use of unequal compressor sizes has the advantage of creating more steps of capacity control.

From an ideal thermodynamic analysis for optimum system efficiency, the optimum temperature change for the liquid leaving each subcooler should be approximately equal to the same value:

$$\Delta T_{opt} = (T_{liq} - ETP)/(N_{sub}+1)$$

where: $\Delta T_{opt}$ equals optimum temperature difference per subcooler, $T_{liq}$ equals the refrigerant liquid temperature leaving the main condenser, ETP equals the evaporating temperature in the main circuit, and $N_{sub}$ equals the number of subcooler circuits connected in series.

For example, for a liquid temperature ($T_{liq}$) of 100° F. (37.8° C.) and an evaporating temperature (ETP) of 40° F. (4.4° C.), the total temperature change is 60° F. (15.6° C.). For two subcoolers, the optimum temperature change for the liquid in the main circuit should be approximately 20° F. (−6.7° C.) per subcooler. This calculation results in a temperature difference for each subcooler that provides suitable compressor sizing. Optimum compressor sizing requires careful consideration of the available compressors, system capacity targets, system cost, and other factors.

In still another embodiment, one or both of the first and second subcooler circuits 210 and 215 may include multiple compressors or variable-capacity compressors. The use of multiple compressors and/or variable-capacity compressors provides additional capacity control.

In a preferred embodiment, the condenser arrangement for the first and second subcooler circuits 210 and 215 includes condenser coils 260 and 272 positioned downstream of condenser coils 118 and 120 of the main circuit 100. This approach allows for the first and second subcooler circuits 210 and 215 to reject heat to the heated air 184 leaving condenser coils 118 and 120 without affecting the condensing temperature of the main circuit 100. The difference between the refrigerant temperature and air temperature is minimized, thereby improving overall system efficiency. The positioning of the first and second condenser coils 260 and 272 provide additional cooling capacity advantages. The first and second condenser coils 260 and 272 are preferably arranged and disposed adjacent and downstream in the air from condenser coils 118 and 120. In addition, the subcooler circuit condenser coils 260 and 272 and condenser coils 118 and 120 are preferably arranged substantially perpendicular to a flow of air through the condenser 190, as shown in FIG. 2. The arrangement of first and second condenser coils 260 and 272 with respect to condenser coils 118 and 120 provides an increased cooling capacity per unit of airflow for the chiller system for a given condensing temperature. The increased cooling capacity per unit of airflow permits the cooling at the evaporator 140 to take place using fewer fans or smaller fans, making the system less expensive, while maintaining or increasing the cooling capacity over a system that has no first and second subcooling circuits 210 and 215.

In another embodiment of the invention, the condenser 190 includes a four-row condenser coil. In this embodiment, the downstream row (i.e., the fourth row) is dedicated to the first and second subcooler circuits 210 and 215 with substantially no change to the three-rows in the main condenser coils 118 and 120. This embodiment permits the condenser headers for the first and second subcooler circuits 210 and 215 to be located at the opposite end of the condenser coils 260 and 272 to simplify piping. The flow of the refrigerant through condenser coils 260 and 272 may be in either direction through the piping and may be selected based upon piping considerations or upon efficiency considerations.

Although the condenser coils 260 and 272 have been shown in FIGS. 2-7 to be arranged downstream in the air from the main circuit condensers coils 118 and 120, the invention is not limited to the preferred arrangement. The subcooler condenser coils 260 and 272 may also be positioned upstream from the main circuit condenser coils 118 and 120. Positioning the condenser coils 260 and 272 upstream in the air of the main circuit 100, condenser coils 118 and 120 permits the subcoolers to receive cooler ambient air, which allows the subcooler circuit condenser coils 260 and 272 to condense refrigerant more efficiently. Further, although FIGS. 2-7 are shown as air-cooled condensers, other fluids, such as water, may be utilized with the condensers of the present invention.

Figure 9:
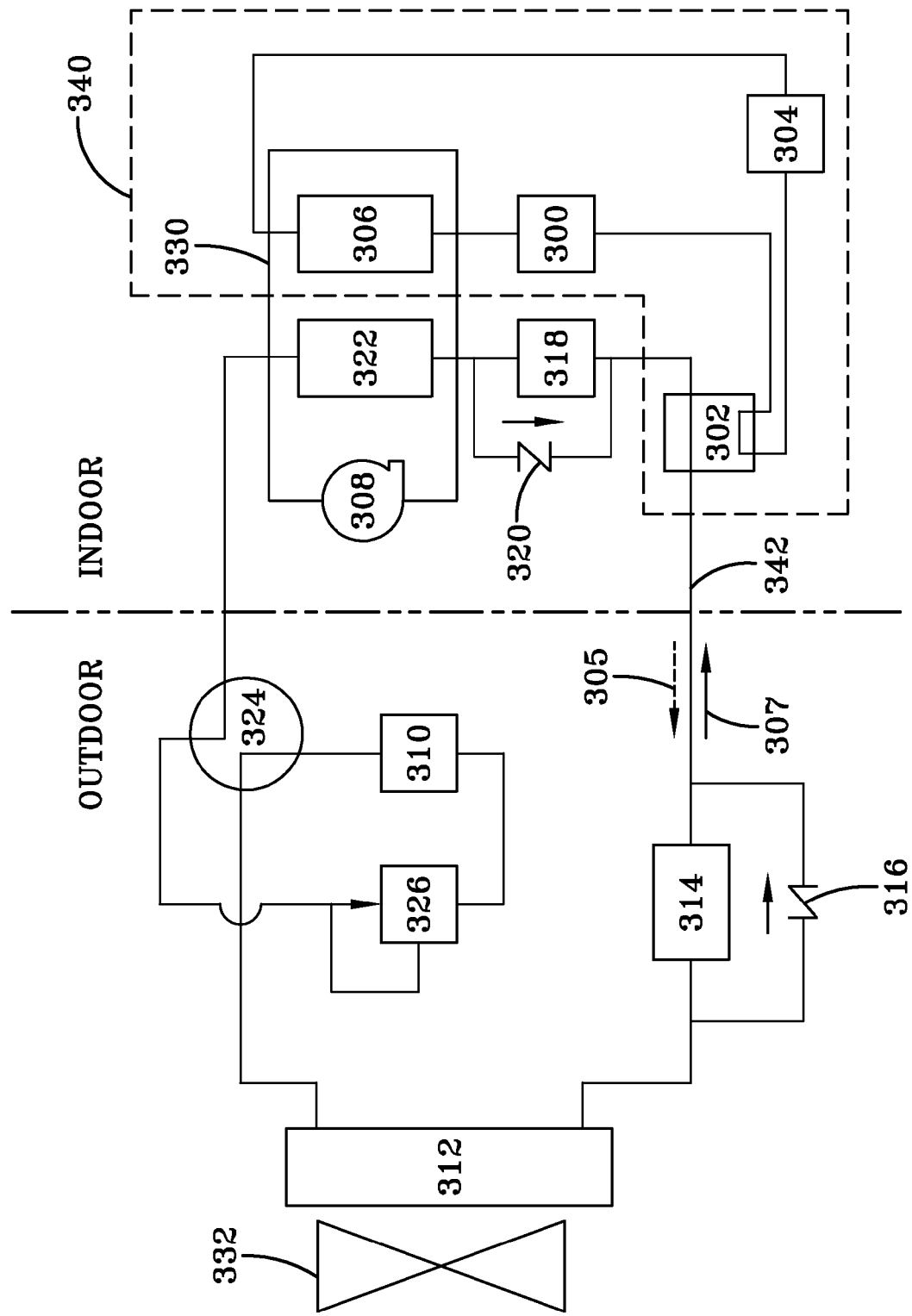
FIG. 9 schematically illustrates a heat pump according to an embodiment of the present invention.

FIG. 9 shows an alternate embodiment of the present invention that is suitable for use in a heat pump in both heating and cooling mode. A powered subcooler 340 is located in the indoor section of a heat pump. Except for the powered subcooler, the heat pump is generally of conventional design. It comprises an outdoor coil 312, an indoor coil 322, an accumulator 326 and a compressor 310 connected to together in a refrigerant circuit. The position of a four-way valve 324 determines whether the system is in heating or cooling mode.

In cooling mode, refrigerant vapor flows from the discharge of the compressor to the outdoor coil 312 where it condenses to a liquid (shown as direction 305 in FIG. 9). Liquid refrigerant flows through a first check valve 316 around a first expansion device 314 and through a liquid line 342 to a second expansion device 318 and then into the indoor coil 322, where the refrigerant changes phase to form vapor. The vapor returns through the four-way valve 324 and the accumulator 326 to compressor 310. An outdoor fan 332 and an indoor fan 308 circulate air over the outdoor coil 312 and the indoor coil 322 respectively.

In heating mode, the four-way valve reverses its position so that discharge gas from the compressor 310 flows through the four-way valve 324 to the indoor coil 322 where it condenses to a liquid (shown as direction 307 in FIG. 9). A second check valve 320 allows liquid to bypass the second expansion device 318 and flow to through the liquid line 342 to the first expansion device 314 located near the outdoor coil 312. Two-phase refrigerant then flows from the first expansion device 314 through the outdoor coil 312 where it evaporators into a vapor. The vapor then flows through the four-way valve 324 to the accumulator 326 and back to the compressor 310.

The powered subcooler is an independent refrigerant circuit comprising a compressor 300 that pumps refrigerant to a condenser 306 through an expansion device 304 to an evaporator 302 and back to the compressor 300. The condenser 306 is located downstream of indoor coil 322 in a duct 330. Although condenser 306 is shown downstream of the indoor coil 322, the condenser may also be located upstream from the coil. The evaporator 302 is cools refrigerant liquid in the main circuit and is located in liquid line 342.

In heating mode the powered subcooler provides additional heating and a higher efficiency than an indoor section and outdoor section that does not utilize a powered subcooler 340. The efficiency increase is a result of a cooling of the refrigerant liquid from the indoor coil 322 while heating air leaving the indoor coil 322.

In cooling mode, the powered subcooler 340 provides improved dehumidification. The operation of the powered subcooler 340 reduces the temperature of liquid entering the indoor coil 322, which reduces coil temperature and increases moisture removal. Subsequent to the passing through the indoor coil 322, heat is added to the air, which provides reheat. The net effect is a substantial improvement in the moisture removal and reduction in the relative humidity of the supply air. A humidistat or similar controller can control the operation of the powered subcooler 340 so that it runs during high humidity conditions and does not run during periods of low latent load so as to minimize energy use.

Figure 10:
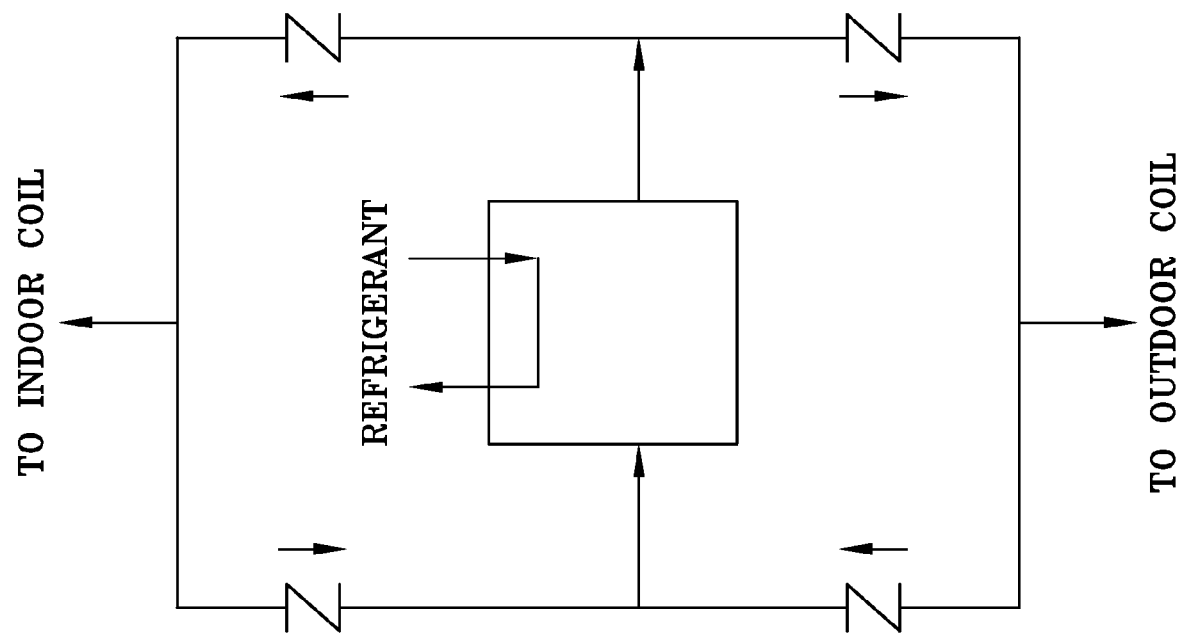
FIG. 10 schematically illustrates a chiller system according to an embodiment of the present invention.

FIG. 10 shows an embodiment of the present invention including a configuration of check valves that would ensure counterflow in the evaporator used in the powered subcooler 340. This configuration would improve performance of the evaporator 302 while maintaining adequate superheat to the compressor 300 in the subcooler. The configuration ensures that refrigerant always flows in the same direction through evaporator 302 regardless of whether it is heating or cooling mode.

Figure 11:
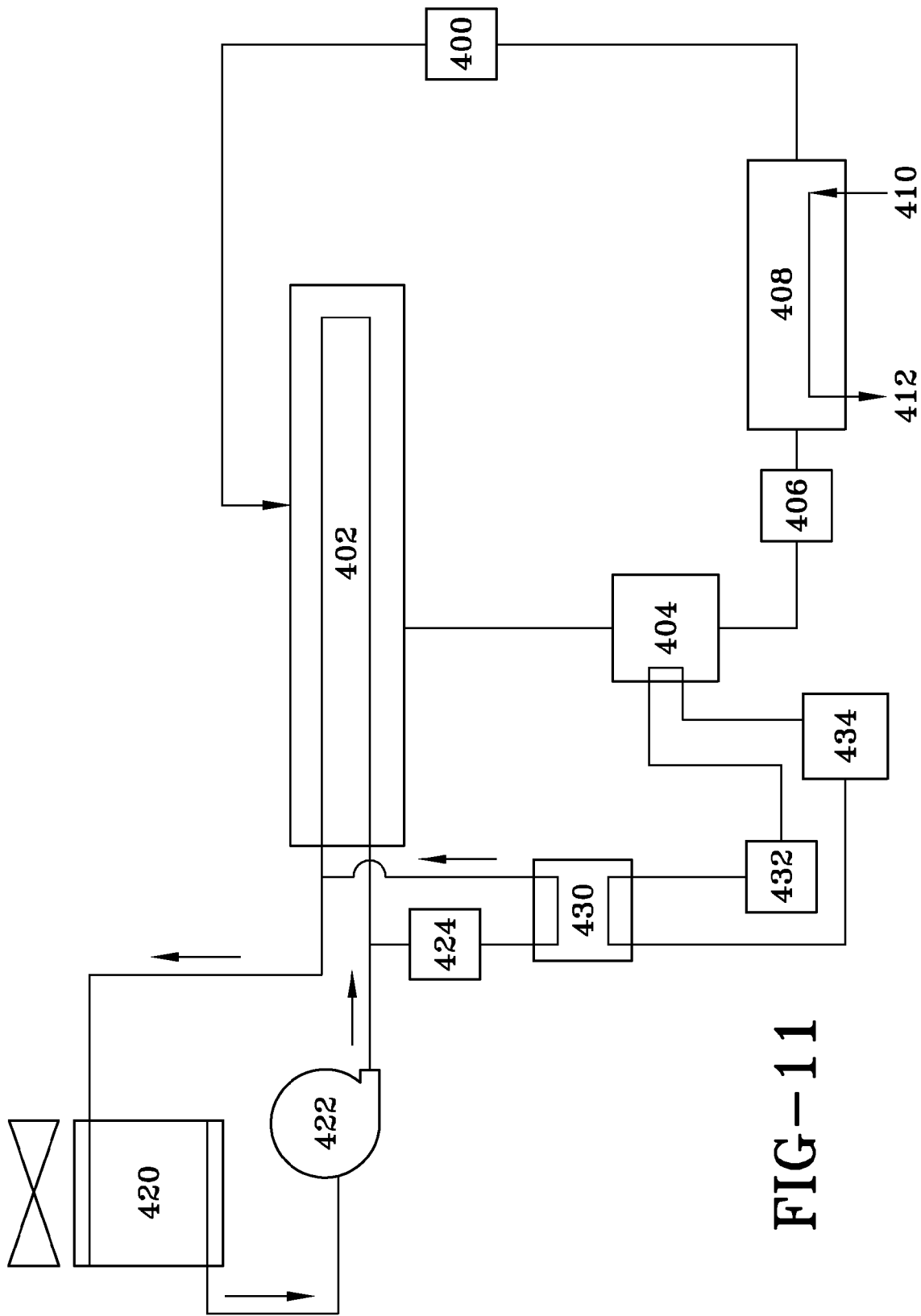
FIG. 11 schematically illustrates a chiller system according to an alternate embodiment of the present invention.

FIG. 11 shows yet another embodiment that is suitable for use with a water-cooled chiller. A compressor 400, a condenser 402, an expansion device 406 and an evaporator 408 form a main refrigerant circuit and are connected in a closed refrigerant loop. Liquid 410 enters the evaporator 408 and exits as chilled liquid 412. A subcooler compressor 432, a subcooler condenser 430, a subcooler expansion device 434, and a subcooler evaporator 404 form a separate refrigerant circuit. The subcooler evaporator 404 is located in the liquid line between the condenser 402 and expansion device 406 in the main refrigerant circuit. Condenser water flows from a cooling tower 420 through a pump 422, or other suitable fluid moving device, through the condenser 402. A portion of the condenser water flows through the subcooler condenser 430. An optional strainer 424 catches dirt and/or debris that could clog the subcooler condenser. The subcooler condenser 430 is preferably a brazed plate heat exchanger. However, the subcooler condenser 430 may be any suitable configuration of heat exchanger capable of operating as a condenser. This configuration can improve efficiency and capacity of the chiller by providing additional subcooling. The lower condensing pressures of this embodiment may allow the use of the same refrigerant in the powered subcooler circuit as in the main circuit, which provided additional advantages, such as simplified refrigerant charging.

Other water cooled condenser configurations may be utilized and may be desirable. For example, the subcooler condenser 430 can be integrated into a unitary condenser shell. For in-tube condensation with a shell-and-tube condenser, the subcooler condenser 430 may be separated from the main condenser(s) 402. The separation may be achieved by use of, for example, a baffle in the head of the condenser(s). For shell-side condensation, a shell with separate tube sheet and create a separate condenser for the powered subcooler in a manner similar to known two-circuit condensers. Yet another alternative includes boiling refrigerant liquid from the condenser in the main circuit to condense refrigerant in the powered subcooler and subsequently recondensing the resulting refrigerant vapor to the main condenser.

Many other variations of the invention are possible. For example, while the embodiments show a single main refrigerant circuit, multiple circuits are possible and would be preferred for large chillers. The main circuits would share a common cooler in configurations that are similar to those in the prior art. In addition, while these systems for chillers uses cooling liquids such as water or brine, the evaporator in the main circuit could cool air or other fluid. This same basic configuration for the powered subcooler can also be applied to rooftop air conditioners, residential air conditioners with the refrigerant in the main evaporator providing direct cooling of indoor air. This system can also be applied to heating systems, in which case the condenser would be heating indoor air or hot water and the evaporator would be drawing thermal energy from outside air, ground loop, or other heat source.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An HVAC system comprising:
a main circuit comprising a main circuit evaporator, a main circuit expansion device, a main circuit condenser and a main circuit compressor connected in a first closed refrigerant loop;
a subcooler circuit comprising a subcooler evaporator, a subcooler expansion device, a subcooler condenser and a subcooler compressor connected in a second closed refrigerant loop, wherein the subcooler compressor is configured to compress high-pressure refrigerant and the subcooler circuit utilizes a refrigerant with a lower operating pressure than the refrigerant in the main circuit, wherein the subcooler circuit is selectably operable;
the subcooler evaporator being arranged and disposed to exchange heat between liquid refrigerant in the main circuit and the refrigerant in the subcooler circuit to cool the liquid refrigerant in the main circuit prior to entering the main circuit evaporator, wherein the main circuit condenser operates independently of the subcooler circuit;
wherein the coils of the subcooler circuit condenser are positioned downstream of a cooling fluid passing over coils of the main circuit condenser; wherein a fluid moving device moves the cooling fluid through the subcooler condenser and the main circuit condenser;
wherein a cooling capacity of the subcooler circuit is less than a cooling capacity of the main circuit; and
wherein the operation of the subcooler circuit provides an increased cooling capacity per unit of a mass flow of cooling fluid through the main circuit condenser and subcooler condenser for the HVAC system with a predetermined design efficiency.

2. The HVAC system of claim 1, wherein the one or both of the main circuit expansion device or the subcooler expansion device outputs a two-phase refrigerant.

3. The HVAC system of claim 1, wherein the system further comprises a controller.

4. The HVAC system of claim 3, wherein the controller activates or deactivates one or more condenser fans in response to one of an ambient air temperature or a refrigerant temperature.

5. The HVAC system of claim 3, wherein the controller activates or deactivates the subcooling circuit in response to parameters selected from a group consisting of: ambient air temperature, compressor operation in the main circuit, and refrigerant temperature.

6. The HVAC system of claim 1, further comprising at least one additional subcooler circuit, wherein each additional subcooler circuit comprises an additional subcooler evaporator, an additional subcooler expansion device, an additional subcooler condenser and an additional subcooler compressor connected in an additional closed refrigerant loop.

7. The HVAC system of claim 1, wherein the subcooler evaporator is a flash tank.

8. The HVAC system of claim 1, wherein the high-pressure refrigerant is a refrigerant selected from the group consisting of carbon dioxide, R32, R125, R410A, R-22, and R-407C.

9. The HVAC system of claim 1, wherein the refrigerant with a lower operating pressure is a refrigerant selected from the group consisting of R-134a, propane, dimethyl ether, and ammonia.

10. An HVAC system comprising:
a main circuit comprising a main circuit evaporator, a main circuit expansion device, a main circuit condenser and a main circuit compressor connected in a first closed refrigerant loop; and
a first subcooler circuit comprising a first subcooler evaporator, a first subcooler expansion device, a first subcooler condenser and a first subcooler compressor connected in a second closed refrigerant loop, wherein the first subcooler circuit is selectably operable;
a second subcooler circuit comprising a second subcooler evaporator, a second subcooler expansion device, a second subcooler condenser and a second subcooler compressor connected in a third closed refrigerant loop, wherein the second subcooler circuit is selectably operable; and
the first subcooler evaporator and second subcooler evaporator each being arranged and disposed to exchange heat between liquid refrigerant in the main circuit and the refrigerant in the corresponding subcooler circuit to cool the liquid refrigerant in the main circuit prior to entering the main circuit evaporator,
wherein the coils of at least one of the first subcooler circuit condenser and the second subcooler circuit condenser are positioned downstream of a cooling fluid passing over coils of the main circuit condenser; wherein a fluid moving device moves the cooling fluid through one or more of the subcooler condensers and the main circuit condenser;
wherein the main circuit condenser operates independently of the first and second subcooler circuits, and
wherein a cooling capacity of the first subcooler circuit and a cooling capacity of the second subcooler circuit is less than a cooling capacity of the main circuit.

11. The HVAC system of claim 10 wherein the first and second subcooler evaporators are arranged in a series flow configuration, the series flow configuration comprising flow of refrigerant in the main circuit through the first subcooler evaporator then through the second subcooler evaporator to increase the evaporating temperature of the first subcooler.

12. The HVAC system of claim 10, wherein at least a portion of the cooling fluid in main circuit condenser also flows through the condenser for one or more of the subcooler circuits.

13. The HVAC system of claim 10, wherein one or more of the first subcooler evaporator or second subcooler evaporator is a flash tank.

14. The HVAC system of claim 10, wherein the first subcooler expansion device and second subcooler expansion device are different devices.

15. The HVAC system of claim 14, wherein the first subcooler expansion device is a fixed orifice and second subcooler expansion device is an expansion valve.

16. The HVAC system of claim 10, wherein the first subcooler compressor and second subcooler compressor have different compressive capacities.

17. The HVAC system of claim 10, wherein refrigerant in the first subcooler circuit is different than the refrigerant in the second subcooler circuit.

18. An HVAC system comprising:
a main circuit comprising a main circuit evaporator, a main circuit expansion device, a main circuit condenser and a main circuit compressor connected in a first closed refrigerant loop, the main circuit circulating a refrigerant with a critical temperature below about 80° C.;
a subcooler circuit comprising a subcooler evaporator, a subcooler expansion device, a subcooler condenser and a subcooler compressor connected in a second closed refrigerant loop, wherein the subcooler circuit is selectably operable;
the subcooler evaporator being arranged and disposed to exchange heat between liquid refrigerant in the main circuit and the refrigerant in the subcooler circuit to cool the liquid refrigerant in the main circuit prior to entering the main circuit evaporator;
wherein coils of the subcooler circuit condenser are positioned downstream of a cooling fluid passing over coils of the main circuit condenser; wherein a fluid moving device moves the cooling fluid through the subcooler condenser and the main circuit condenser;
wherein the main circuit condenser operates independently of the subcooler circuit;
wherein a cooling capacity of the subcooler circuit is less than a cooling capacity of the main circuit; and
wherein the operation of the subcooler circuit provides greater cooling capacity per unit of a mass flow of cooling fluid through the main circuit condenser and subcooler condenser for the HVAC system with a predetermined design efficiency.

19. The HVAC system of claim 18, wherein said refrigerant circulated in the main circuit comprises a mixture of R-125 and R-32.

20. The HVAC system of claim 18 wherein said refrigerant circulated in the main circuit comprises R-410A.

21. The HVAC system of claim 18 wherein said refrigerant circulated in the main circuit comprises carbon dioxide.

22. The HVAC system of claim 18 wherein said refrigerant circulated in the main circuit comprises a condensing temperature greater than about 20° C.

23. A method for subcooling an HVAC system, comprising:
providing a main circuit comprising a main circuit evaporator, a main circuit expansion device, a main circuit condenser and a main circuit compressor connected in a first closed refrigerant loop;
providing a subcooler circuit comprising a subcooler evaporator, a subcooler expansion device, a subcooler condenser and a subcooler compressor connected in a second closed refrigerant loop, wherein the subcooler circuit is selectably operable;
positioning coils of the subcooler circuit condenser downstream of the coils of the main circuit condenser so that cooling fluid of the main circuit condenser is configured to pass over coils of the main circuit condenser prior to passing over coils of the subcooler circuit condenser;
subcooling refrigerant in the main circuit with the subcooler evaporator prior to the refrigerant in the main circuit entering the main circuit evaporator to provide an increased cooling capacity per unit of airflow for the HVAC system with a predetermined design efficiency, wherein the main circuit condenser operates independently of the subcooler circuit, and wherein a cooling capacity of the subcooler circuit is less than a cooling capacity of the main circuit;

sensing one of an ambient air temperature or a refrigerant temperature;

activating or deactivating the compressor in at least one of the main circuit and the subcooler circuit in response to the sensed condition; and activating or deactivating one or more fluid moving devices providing fluid flow to the main circuit condenser and subcooler condenser in response to the sensed condition.

24. The method of claim 23, further comprising condensing at least a portion of refrigerant in the subcooling circuit with air entering or exiting the main circuit condenser.

25. The method of claim 23, further comprising configuring the subcooler compressor to compress high-pressure refrigerant and circulating a low-pressure refrigerant in the subcooler circuit.

* * * * *